United States Patent
Kawakami et al.

(10) Patent No.: US 7,457,486 B2
(45) Date of Patent: Nov. 25, 2008

(54) IMAGING DEVICE (75) Inventors: Makoto Kawakami, Hirakata (JP);
Kazuyuki Inokuma, Yawata (JP);
Toshiya Fujii, Ohtsu (JP)

(73) Assignee: Panasonic Corporation, Osaka (JP)

( * ) Notice: Subject to any disclaimer, the term of this patent is extended or adjusted under 35 U.S.C. 154(b) by 644 days.

(21) Appl. No.: 10/952,862

(22) Filed: Sep. 30, 2004

(65) Prior Publication Data
US 2005/0068426 A1 Mar. 31, 2005

(30) Foreign Application Priority Data
Sep. 30, 2003 (JP) .............................. 2003-341987

(51) Int. Cl.
G06K 7/00 (2006.01)
G06K 9/20 (2006.01)
G06K 9/32 (2006.01)
H04N 9/083 (2006.01)

(52) U.S. Cl. ..................... 382/312; 382/298; 382/299; 348/282

(58) Field of Classification Search ................ 382/312; 348/222.1, 240.99, 282
See application file for complete search history.

(56) References Cited

U.S. PATENT DOCUMENTS

| | | | | |
|---|---|---|---|---|
| 5,828,406 A * | 10/1998 | Parulski et al. | ........... | 348/220.1 |
| 6,686,960 B2 * | 2/2004 | Iizuka | ........... | 348/273 |
| 6,798,454 B1 * | 9/2004 | Kashiwagi et al. | ........... | 348/324 |
| 6,915,023 B2 | 7/2005 | Hamada et al. | | |
| 6,992,714 B1 * | 1/2006 | Hashimoto et al. | ........... | 348/273 |
| 7,148,926 B2 * | 12/2006 | Morinaka et al. | ........... | 348/277 |
| 7,257,278 B2 * | 8/2007 | Burks et al. | ........... | 382/312 |
| 2002/0181800 A1 | 12/2002 | Hamada et al. | | |
| 2003/0086005 A1 * | 5/2003 | Nakamura | ........... | 348/223.1 |
| 2004/0196396 A1 | 10/2004 | Fujii et al. | | |

FOREIGN PATENT DOCUMENTS

| | | |
|---|---|---|
| CN | 1390419 A | 1/2003 |
| CN | 1168289 C | 9/2004 |
| EP | 1 237 360 | 9/2002 |
| JP | 2002-374407 A | 12/2002 |
| JP | 2003-78919 A | 3/2003 |
| JP | 2004-312140 | 11/2004 |

* cited by examiner

*Primary Examiner*—Jingge Wu
*Assistant Examiner*—Jose M Torres
(74) *Attorney, Agent, or Firm*—McDermott Will & Emery LLP (57) ABSTRACT

A solid-state imaging element includes photoelectric conversion elements having a complementary or Bayer color filter array. The solid-state imaging element adds together electric charges stored in nine photoelectric conversion elements having color filters of one of multiple colors in each portion of six rows and six columns, to obtain a resulting electric charge, and outputs the resulting electric charge as one pixel. A portion for one of the colors deviates from a portion for each of the other colors by three rows and/or three columns. This pixel-addition operation produces an effect of a spatial low pass filter, thereby reducing signal components exceeding a Nyquist frequency corresponding to a target resolution. Consequently, aliasing noise in an image with the target resolution is reduced, and therefore higher image quality can be achieved, when compared with a conventional resolution reduction technique.

4 Claims, 8 Drawing Sheets

IMAGING DEVICE

BACKGROUND OF THE INVENTION (1) Field of the Invention

The present invention relates to an imaging device, especially to a technique to produce an image with a resolution lower than an original resolution of the imaging device and excellent image quality.

(2) Description of the Related Art

In recent years, solid-state imaging elements have a larger number of pixels. Solid-state imaging elements with a resolution exceeding megapixel, i.e. one million pixels are now used even in simple devices such as compact cameras and mobile telephones.

Accordingly, still pictures with a very high resolution can be taken with such simple devices. On the other hand, images with a resolution lower than an original resolution of a solid-state imaging element are necessary to be used for individual frame pictures of a moving picture and images to be attached with e-mails. Accordingly, an operation for reducing a resolution has become indispensable.

As a technique to produce an image with a target resolution lower than an original resolution of a solid-state imaging element, it is known to discard some of the pixels of the solid-state imaging element. A resolution of an image produced by this technique is one N-th of the original resolution of the solid-state imaging element, where N is an integer.

If the resolution of the image produced by the technique of discarding pixels is not equal to the target resolution, a zoom operation is further performed to produce the image with the target resolution.

A technique to perform such a zoom operation with minimizing worsening in image quality is, for example, disclosed in Japanese unexamined patent application publication No. 2002-374407 (hereinafter referred to as a patent document 1).

However, such a conventional technique of discarding pixels and performing a zoom operation can not produce an image with excellent image quality in addition to a resolution lower than an original resolution of a solid-state imaging element. This is because the discarding of pixels causes large aliasing noise to be generated.

SUMMARY OF THE INVENTION

In view of the above problem, an object of the present invention is to provide an imaging device which produces an image with a resolution lower than an original resolution of a solid-state imaging element and excellent image quality.

The above object can be achieved by an imaging device that produces image data showing an image with a target resolution lower than an original resolution of the imaging device. The imaging device includes: a plurality of photoelectric conversion elements which are arranged in a two-dimensional matrix, each have a color filter of a predetermined color selected from a plurality of colors on a light-receiving surface thereof, and each store an electric charge by photoelectric conversion; a charge adding unit operable to, for each portion of L rows and C columns in the matrix, where $6 \leqq L$, $6 \leqq C$ and L and C are even natural numbers, add together electric charges stored in photoelectric conversion elements that have color filters of a same color in the portion, to obtain a resulting electric charge; a read unit operable to read resulting electric charges for all portions of L rows and C columns in the matrix; an image data generating unit operable to generate image data showing an image based on the read resulting electric charges, the image having a tentative resolution which is lower than the original resolution; and a zoom unit operable to zoom the image with the tentative resolution so as to reduce the tentative resolution to the target resolution and produce the image data showing the image with the target resolution. Here, a number of the plurality of photoelectric conversion elements is greater than a number of photoelectric conversion elements required for the tentative resolution to be equal to the target resolution.

According to this construction, the electric charges stored in the photoelectric conversion elements of the same color in each portion of L rows and C columns are added together, to obtain the resulting electric charge. This produces an effect of a spatial low pass filter, and therefore reduces signal components exceeding a Nyquist frequency corresponding to the target resolution. As a result, aliasing noise in the image with the target resolution is reduced, and therefore image quality is improved, when compared with a conventional resolution reduction technique of discarding pixels, which does not produce the effect of the spatial low pass filter.

The number of the plurality of photoelectric conversion elements is greater than the number of photoelectric conversion elements required for the tentative resolution to be equal to the target resolution. Accordingly, the image data showing the image with the target resolution can be obtained in such a manner that the image with the tentative resolution higher than the target resolution is first generated, and then the image with the tentative resolution is zoomed to reduce the tentative resolution to the target resolution. Here, a signal component at the Nyquist frequency corresponding to the target resolution can be kept in the image with the target resolution, if a technique disclosed in the patent document 1 is used to perform the zoom operation.

For a comparison purpose, consider a case where the number of the photoelectric conversion elements is equal to the number of photoelectric conversion elements required for the tentative resolution to be equal to the target resolution. In this case, the zoom operation can not be performed, and it is impossible to keep the signal component at the Nyquist frequency corresponding to the target resolution in the image with the target resolution.

Which is to say, the image with the target resolution obtained by the imaging device has a higher level of high-frequency components in the vicinity of the Nyquist frequency corresponding to the target resolution.

Here, the imaging device may further include a contour-correction unit operable to correct the image data showing the image with the target resolution to enhance a contour part of the image.

According to this construction, the level of high-frequency signal components is further improved. As a consequence, excellent image quality can be achieved.

Here, in each portion, the charge adding unit may add together electric charges stored in photoelectric conversion elements having color filters of one of the plurality of colors, and a portion for one of the plurality of colors may deviate from a portion for each of a rest of the colors.

According to this construction, pixels with different colors are not located close to each other, as a result of the charge addition. Respective pixels with all of the colors are more likely to be evenly arranged. As a consequence, excellent image quality can be achieved.

Here, L=4m+2 and C=4n+2, where m and n are natural numbers, and the portion for one of the colors may deviate from the portion for each of the rest of the colors by L/2 rows, by C/2 columns, or by L/2 rows and C/2 columns.

According to this construction, a pixel with a particular color lies precisely midst between two pixels with a different color, as a result of the charge addition. Thus, respective pixels with all of the colors are arranged at even intervals. As a consequence, excellent image quality can be achieved.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

In the drawings.

DESCRIPTION OF THE PREFERRED EMBODIMENT

An imaging device relating to an embodiment of the present invention produces image data showing an image with a target resolution in the following manner. Electric charges stored in each group of the predetermined number of pixels in an solid-state imaging element are added together, to obtain a resulting electric charge. Thus, the solid-state imaging element produces image data showing an image with a tentative resolution which is lower than an original resolution of the solid-state imaging element and higher than the target resolution. In the image with the tentative resolution, each pixel is represented by a resulting electric charge. After this, the solid-state imaging element performs a zoom operation and a contour correction operation on the image data with the tentative resolution, to produce the image data showing the image with the target resolution.

The following part describes the imaging device relating to the embodiment of the present invention with reference to the attached drawings.

(Construction of the Imaging Device 30)

Figure 1:
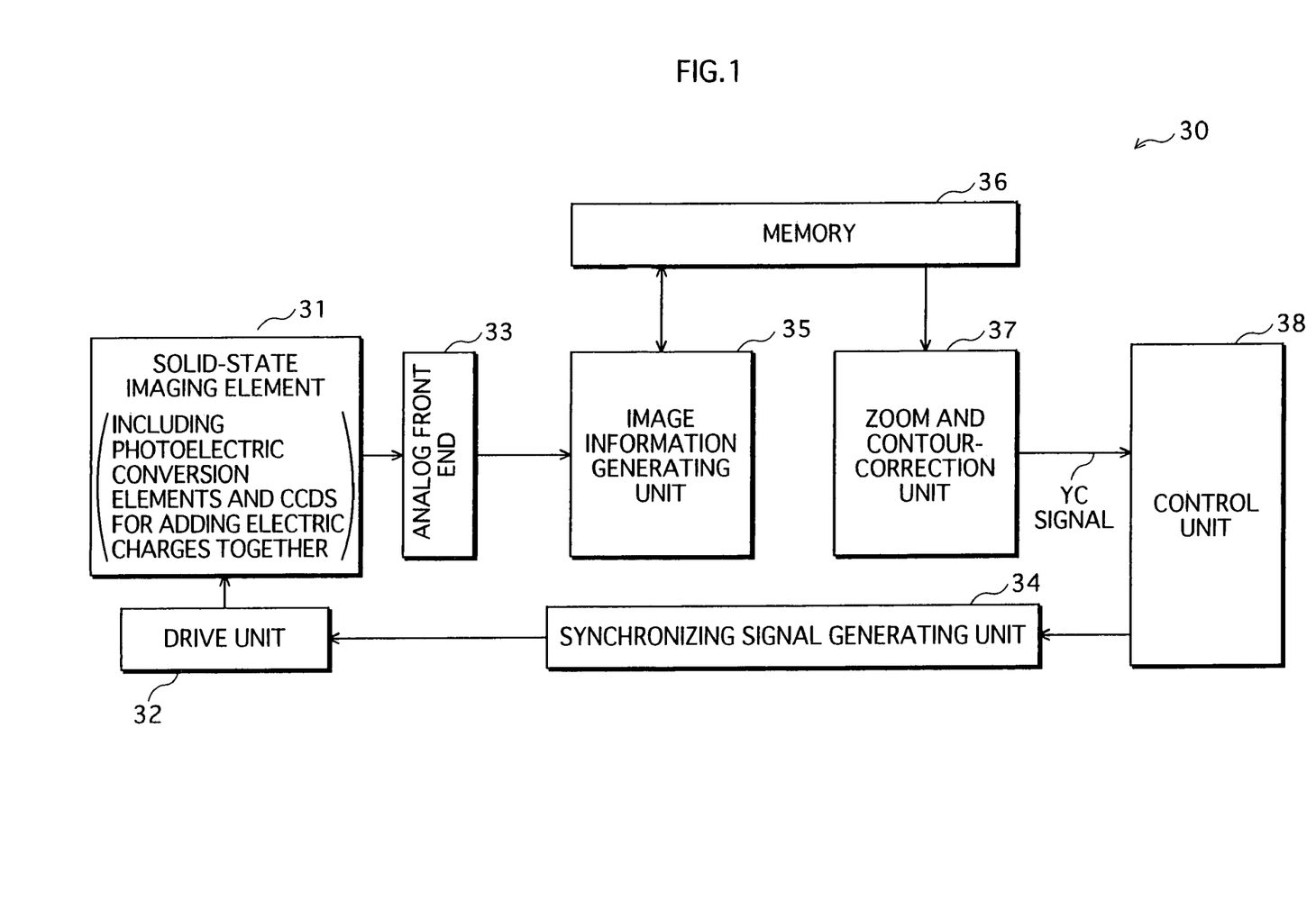
FIG. 1 is a functional block diagram illustrating, as an example, a construction of a main part of an imaging device 30.

FIG. 1 is a functional block diagram illustrating, as an example, a construction of a main part of an imaging device 30 relating to a subject matter of the present invention.

A solid-state imaging element 31 is formed in such a manner that a plurality of photoelectric conversion elements are arranged in a two-dimensional matrix on a semiconductor substrate. Each photoelectric conversion element has, on its light-receiving surface, a color filter of a color selected from a plurality of different colors. Also, each photoelectric conversion element converts, into an electric charge, an amount of light received from an object during a time period indicated by a drive signal sent from a drive unit 32.

The solid-state imaging element 31 reads the electric charge stored in each photoelectric conversion element and outputs a signal corresponding to the read electric charge to an analog front end 33. Alternatively, the solid-state imaging element 31 may add electric charges together, to obtain a resulting electric charge, read from photoelectric conversion elements having color filters of the same color in each portion of L rows and C columns, which is formed by partitioning the matrix of the photoelectric conversion elements ($6 \leq L$, $6 \leq C$, and L and C are even natural numbers), read the resulting electric charge for each portion, and output a signal corresponding to the resulting electric charge to the analog front end 33.

It can be changed from one to other as to whether the solid-state imaging element 31 reads the electric charge in each photoelectric conversion element or reads the resulting electric charge, in accordance with the drive signal sent from the drive unit 32.

Here, it is assumed that the number of pixels having color filters of the same color in each portion of L rows and C columns is LC/4. In the case of reading the resulting electric charge, the solid-state imaging element 31 has a LC/4-fold sensitivity and a 4/LC-fold resolution, compared with the case of reading the electric charge in each photoelectric conversion element.

The solid-state imaging element 31 is described in detail later.

The analog front end 33 performs the correlated double sampling (CDS) and the auto gain control (AGC) on the signal received from the solid-state imaging element 31, and then converts the signal into a digital signal.

An image information generating unit 35, a zoom and contour-correction unit 37, a control unit 38 and a synchronizing signal generating unit 34 are specifically realized by using a digital signal processor (DSP), a central processing unit (CPU), a read only memory (ROM) and the like. In detail, functions of these units are realized in such a manner that the DSP and the CPU execute a program stored in the ROM.

The image information generating unit 35 generates image data by processing the digital signal received from the analog front end 33 by means of a memory 36. The image data shows a photographed image based on luminance and color difference. The image information generating unit 35 stores the generated image data into the memory 36. The memory 36 is, for example, realized by a synchronous dynamic random access memory (SDRAM).

The zoom and contour-correction unit 37 includes an image processing unit disclosed in the above-mentioned patent document 1. After reading the image data stored in the memory 36, the zoom and contour-correction unit 37 causes the image processing unit to perform a zoom operation and a known contour correction operation on the read image data, to obtain image data which has a target resolution and whose contour part has been corrected. The zoom and contour-correction unit 37 outputs the obtained image data to the control unit 38. The contour correction operation is, for example, performed with use of a filter that corrects a luminance of a pixel located where a luminance gradient changes, so that the change in luminance gradient increases.

The control unit 38 receives the image data from the zoom and contour-correction unit 37. The control unit 38 stores the image data in another memory (not shown in FIG. 1), or displays an image shown by the image data on a display unit (not shown in FIG. 1).

(Solid-State Imaging Element 31)

The solid-state imaging element 31 is based on an invention that is disclosed in Japanese patent application No. 2003-100187 (hereinafter referred to as a related application). The following part describes the solid-state imaging element 31 based on a typical embodiment of the invention disclosed in the related application. To make the description simple, different terminologies from those used in the related application may be used within a scope that does not undermine the identity of the technical contents in the present and related applications.

(Examples of Color Filter Array Pattern and Portion of Charge Addition)

Figure 2:
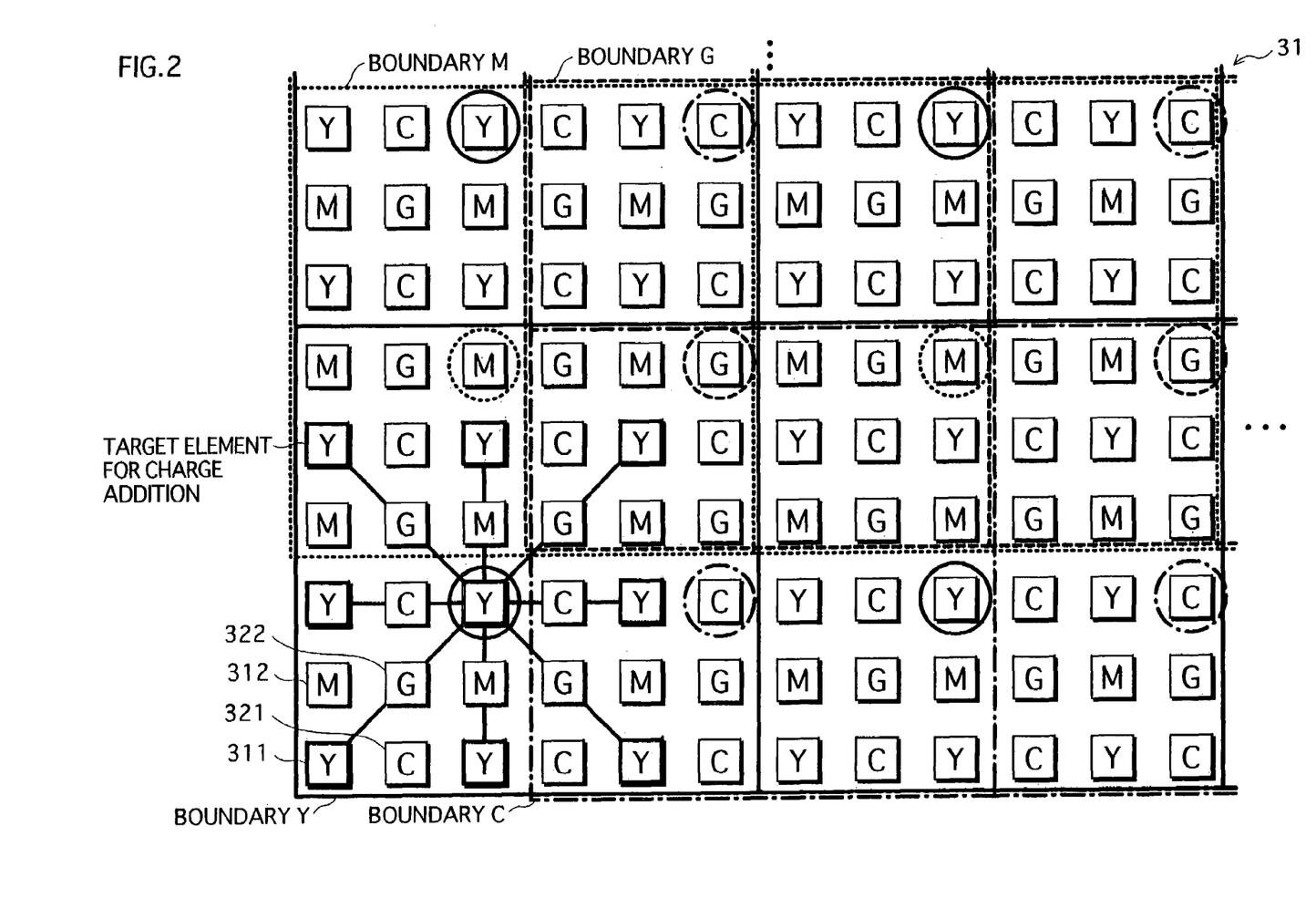
FIG. 2 is a schematic view illustrating a solid-state imaging element 31 (shown in FIG. 1) seen from a direction of incoming light.

FIG. 2 is a schematic view illustrating the solid-state imaging element 31 seen from a direction of incoming light. FIG. 2 only shows a part of the solid-state imaging element 31. The solid-state imaging element 31 is formed in such a manner that a plurality of photoelectric conversion elements (311, 312, 321, 322, . . . ) are arranged in a two-dimensional matrix on a semiconductor substrate. The photoelectric conversion elements 311, 312, 321 and 322 respectively have color filters of yellow (Y), magenta (M), cyan (C), and green (G) on their light-receiving surfaces. This color filter array pattern is a typical example of a complementary color filter array pattern. Each of the photoelectric conversion elements in the solid-state imaging element 31 has a color filter of one of the colors in accordance with this array pattern.

The solid-state imaging element 31 has a function of adding together electric charges, to obtain a resulting electric charge, stored in photoelectric conversion elements, as a result of photoelectric conversion, having color filters of the same color in each portion of six rows and six columns. Each portion is formed by partitioning the matrix of the plurality of photoelectric conversion elements. The following part first briefly describes a portion that is defined by a boundary to specify photoelectric conversion elements whose electric charges are added (hereinafter referred to as a portion of charge addition) and then specifically explains a construction to realize the charge adding function.

In FIG. 2, as an example, portions of charge addition of six rows and six columns for yellow, magenta, cyan and green are respectively defined by a boundary Y, a boundary M, a boundary C, and a boundary G. FIG. 2 shows, as an example, a case where each of the boundaries for the colors defines a different portion of charge addition. The boundary Y deviates from the boundary M by three rows, from the boundary C by three columns, and from the boundary G by three rows and three columns.

In the portion defined by the boundary Y, nine photoelectric conversion elements which have color filters of yellow and whose electric charges are added together are identified by continuous lines. A circle within the boundary Y represents a location of a yellow pixel indicated by a resulting electric charge obtained by the charge addition in the portion defined by the boundary Y. Which is to say, the circle represents a center of the nine pixels whose electric charges are added together.

In the other portions of charge addition, only a location of a pixel indicated by a resulting electric charge which is obtained by charge addition is identified by a circle. Regarding each portion of charge addition, the solid-state imaging element 31 adds together an electric charge stored in a photoelectric conversion element identified by a circle and electric charges in photoelectric conversion elements which have color filters of the same color as the circled element and are located the closest to the circled element in row, column and diagonal directions.

Pixels indicated by resulting electric charges obtained by charge addition are arranged at even intervals in a two-dimensional matrix, similarly to the original pixels, and also have the same color filter array pattern as the original pixels. The solid-state imaging element 31 performs charge addition on all of the photoelectric conversion elements in the solid-state imaging element 31, except for photoelectric conversion elements located near edges of the semiconductor substrate which can not form a complete portion of charge addition.

It should be noted that the boundaries, the continuous lines and the circles illustrated in FIG. 2 are only provided for an explanation purpose and not physically formed on the semiconductor substrate as constituents of the solid-state imaging element 31.

(Detailed Description of Construction and Operation)

The following part describes the solid-state imaging element 31 based on the typical embodiment of the invention disclosed in the related application.

Figure 3:
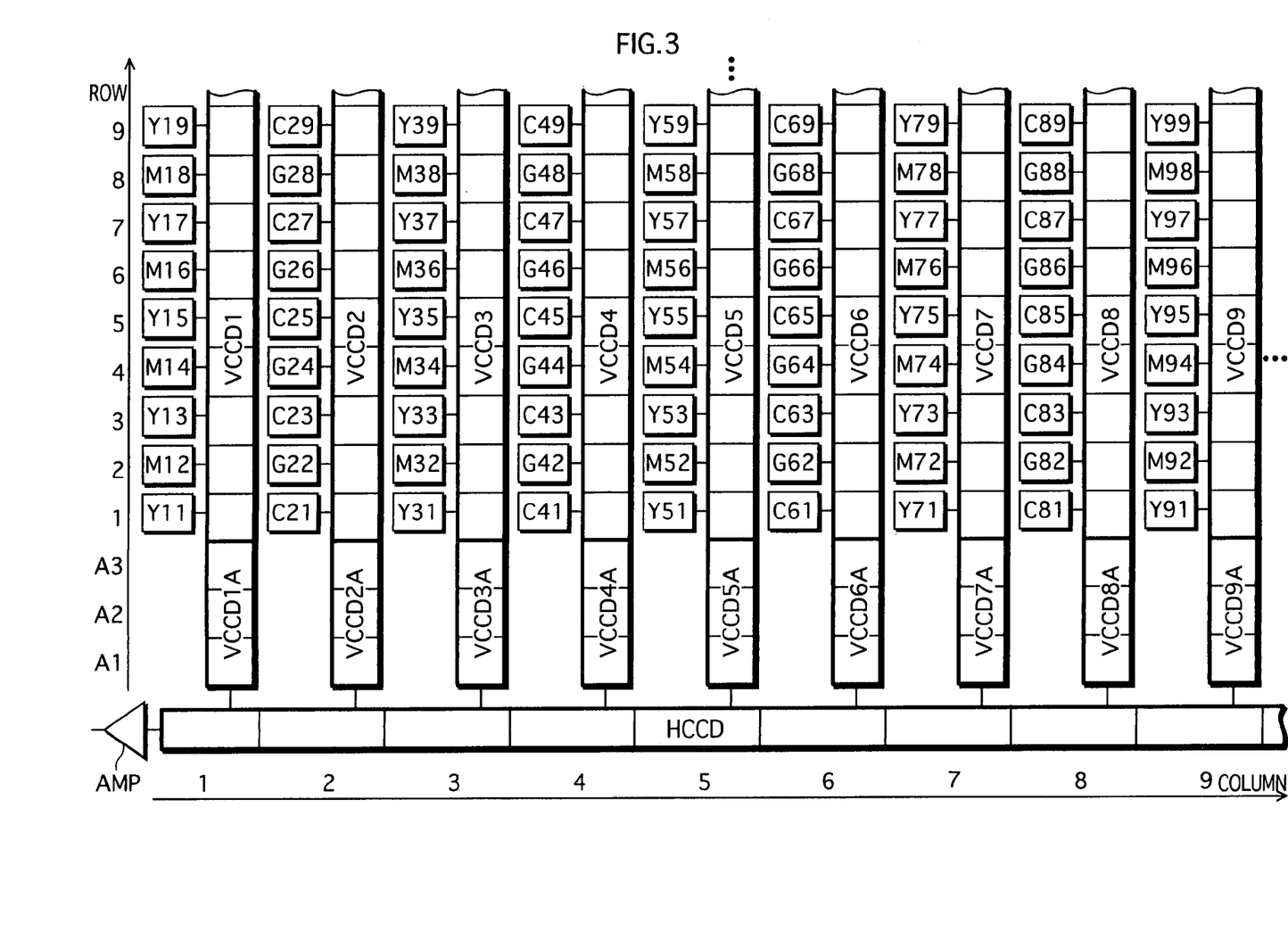
FIG. 3 illustrates, as an example, a construction of the solid-state imaging element 31, which is realized by a charge-coupled device (CCD) solid-state imaging device.

FIG. 3 illustrates, as an example, a concrete construction to achieve the above-mentioned charge addition in the solid-state imaging element 31, which is realized by a CCD solid-state imaging element.

In FIG. 3, photoelectric conversion elements (Y11, M12, C21, and G22, . . . ) each have a color filter in accordance with the color filter array pattern described above. Vertical CCDs (VCCD 1, VCCD 2, . . . ) are provided in one-to-one correspondence with the columns of the matrix. Each vertical CCD is made up of a plurality of stages in one-to-one correspondence with the rows of the matrix. Each vertical CCD receives an electric charge from each of corresponding photoelectric conversion elements. Here, the individual electric charges are transferred as they are, or added together while transferred. Connection CCDs (VCCD 1A, VCCD 2A . . . ) are provided, at one end of each vertical CCD, in one-to-one correspondence with the vertical CCDs (VCCD 1, VCCD 2, . . . ). Each connection CCD is made up of stages corresponding to three rows. Also, each connection CCD transfers an electric charge from a corresponding one of the vertical CCDs to a horizontal CCD (HCCD). The horizontal CCD is made up of stages in one-to-one correspondence with the columns of the matrix. The horizontal CCD receives an electric charge from each of the vertical CCDs. Here, the individual electric charges are transferred as they are, or added together to obtain a resulting electric charge while transferred. An output amplifier (AMP) outputs an electric signal corresponding to an electric charge received from the horizontal CCD.

To drive the solid-state imaging element 31 with this construction, the drive unit 32 under control of the synchronizing signal generating unit 34 sends a storing signal, a read signal, a vertical transfer signal, a connection transfer signal, and a horizontal transfer signal, to the solid-state imaging element 31.

The solid-state imaging element 31 has wirings to simultaneously send the storing signal to all of the photoelectric conversion elements. The photoelectric conversion elements each convert light, into an electric charge, received from an object during reception of the storing signal, and store the electric charge.

The read signal includes a first read signal, a second read signal, and a third read signal that are individually sent. The solid-state imaging element 31 has wirings to send the first read signal to all photoelectric conversion elements in 3i-th rows (i is a natural number) simultaneously, the second read signal to all photoelectric conversion elements in (3i−1)-th rows (i is a natural number) simultaneously, and the third read signal to all photoelectric conversion elements in (3i−2)-th rows (i is a natural number) simultaneously. When a corresponding one of the first to third read signals is received, each photoelectric conversion element transfers an electric charge to a corresponding stage in the vertical CCDs.

The vertical transfer signal includes a first vertical transfer signal, a second vertical transfer signal, and a third vertical transfer signal, which are individually sent. The solid-state imaging element 31 has wirings to send the first vertical transfer signal to all vertical CCDs in 3j-th columns (j is a natural number) simultaneously, the second vertical transfer signal to all vertical CCDs in (3j−1)-th columns (j is a natural number) simultaneously, and the third vertical transfer signal to all vertical CCDs in (3j−2)-th columns (j is a natural number) simultaneously. When a corresponding one of the first to third vertical transfer signals is received, electric charges stored in respective stages in each vertical CCD are transferred one stage in the downward direction.

The following part describes how electric charges are added together while transferred in each vertical CCD, with reference to the above-mentioned control signals.

To start with, when the second read signal is sent, electric charges stored in photoelectric conversion elements in the second, fifth, eighth rows, . . . are each transferred to a corresponding stage in each vertical CCD. After this, the first, second and third vertical transfer signals are each sent twice. Thus, the received electric charges in each vertical CCD are transferred two stages in the downward direction. Specifically speaking, an electric charge received from a photoelectric conversion element in the eighth row has been transferred to a stage corresponding to the sixth row in each vertical CCD, and an electric charge received from a photoelectric conversion element in the fifth row has been transferred to a stage corresponding to the third row in each vertical CCD.

The first read signal is next sent. Accordingly, electric charges in photoelectric conversion elements in the third, sixth, ninth rows, . . . are each transferred to a corresponding stage in each vertical CCD. In this way, electric charges received from the photoelectric conversion elements in the eighth and sixth rows are added together, to obtain an electric charge for two pixels, in a stage corresponding to the sixth row in each vertical CCD. Similarly, electric charges received from the photoelectric conversion elements in the fifth and third rows are added together, to obtain an electric charge for two pixels, in a stage corresponding to the third row in each vertical CCD.

After this, the first, second and third vertical transfer signals are each sent twice. Thus, the electric charges for two pixels in each vertical CCD are transferred two stages in the downward direction. Then, the third read signal is sent, so that electric charges in photoelectric conversion elements in the first, fourth, seventh rows, . . . are each transferred to a corresponding stage in each vertical CCD. In this way, electric charges received from the photoelectric conversion elements in the eighth, sixth and fourth rows are added together, to obtain an electric charge for three pixels, in a stage corresponding to the fourth row in each vertical CCD. Similarly, electric charges received from the photoelectric conversion elements in the fifth, third and first rows are added together, to obtain an electric charge for three pixels, in a stage corresponding to the first row in each vertical CCD.

The following part describes other control signals.

The connection transfer signal includes a first connection transfer signal, a second connection transfer signal, and a third connection transfer signal, which are individually sent. The solid-state imaging element 31 has wirings to send the first connection transfer signal to all connection CCDs in 3j-th columns (j is a natural number) simultaneously, the second connection transfer signal to all connection CCDs in (3j−1)-th columns (j is a natural number) simultaneously, and the third connection transfer signal to all connection CCDs in (3j−2)-th columns (j is a natural number) simultaneously. When a corresponding one of the first to third connection transfer signals is received, electric charges stored in respective stages in each connection CCD are transferred one stage in the downward direction, and an electric charge in the lowest stage to a corresponding stage in the horizontal CCD.

The solid-state imaging element 31 has wirings to send the horizontal transfer signal to the horizontal CCD. When the horizontal transfer signal is received, electric charges in respective stages in the horizontal CCD are transferred one stage in the leftward direction.

The following part describes how electric charges are added together while transferred in the horizontal CCD, with reference to the above-described control signals.

The first, second and third vertical transfer signals and the first, second and third connection transfer signals are each sent three times. Thus, an electric charge for three pixels is transferred to the lowest stage in each connection CCD.

After this, when the second connection transfer signal is received, an electric charge for three pixels in the lowest stage in each of the connection CCDs in the second, fifth, eighth columns, . . . is transferred to a corresponding stage in the horizontal CCD. Then, the horizontal transfer signal is sent twice, so that the received electric charges for three pixels in the horizontal CCD are transferred two stages in the leftward direction. Specifically speaking, an electric charge for three pixels received in the stage corresponding to the eighth column is transferred to a stage corresponding to the sixth column in the horizontal CCD. Similarly, an electric charge for three pixels received in the stage corresponding to the fifth column is transferred to a stage corresponding to the third column in the horizontal CCD.

Then, when the first connection transfer signal is received, an electric charge for three pixels in the lowest stage in each of the connection CCDs in the third, sixth, ninth columns, . . . is transferred to a corresponding stage in the horizontal CCD. Thus, the electric charges for three pixels from the connection CCDs in the eighth and sixth columns are added together, to obtain an electric charge for six pixels, in the stage corresponding to the sixth column in the horizontal CCD. Similarly, the electric charges for three pixels from the connection CCDs in the fifth and third columns are added together, to obtain an electric charge for six pixels, in the stage corresponding to the third column in the horizontal CCD.

After this, the horizontal transfer signal is again sent twice. Thus, the electric charges for six pixels in the horizontal CCD are transferred two stages in the leftward direction. When the third connection transfer signal is received, an electric charge for three pixels in the lowest stage in each of the connection CCDs in the first, fourth, seventh columns, . . . is transferred to a corresponding stage in the horizontal CCD. Thus, the electric charges for three pixels from the connection CCDs in the eighth, sixth and fourth columns are added together, to obtain an electric charge for nine pixels, in the stage corresponding to the fourth column in the horizontal CCD. Similarly, the electric charges for three pixels from the connection CCDs in the fifth, third and first columns are added together, to obtain an electric charge for nine pixels, in the stage corresponding to the first column in the horizontal CCD.

The electric charges for nine pixels in the horizontal CCD are output to the analog front end 33 through the output amplifier (AMP).

As described above, the solid-state imaging element 31 has a distinctive construction to individually transfer electric charges stored in photoelectric conversion elements in each predetermined group of rows to the vertical CCDs and to individually transfer electric charges in vertical CCDs in each predetermined group of columns to the horizontal CCD.

This construction enables the solid-state imaging element 31 to add together electric charges while electric charges are transferred in each vertical CCD and the horizontal CCD, in accordance with the distinctive control signals sent from the drive unit 32. Accordingly, the solid-state imaging element 31 can add together electric charges, to obtain a resulting electric charge for nine pixels, and outputs the resulting electric charge as one pixel.

The drive unit 32 may send conventional control signals. According to the conventional control signals, electric charges in the photoelectric conversion elements in all of the rows are simultaneously transferred to each vertical CCD, and electric charges in the vertical CCDs in all of the columns are simultaneously transferred to the horizontal CCD through the connection CCDs. If such is the case, the solid-state imaging element 31 outputs an electric charge stored in each one of the photoelectric conversion elements as one pixel.

This can produce an image with an original resolution of the solid-state imaging element 31. However, this is not directly related to the subject matter of the present invention of producing an image with a resolution lower than the original resolution of the solid-state imaging element 31 and excellent image quality, and therefore not explained in detail.

Each stage of the vertical CCDs, the connection CCDs and the horizontal CCD may be made up of a plurality of gates. When each stage is made up of two gates, each of the first to third vertical transfer signals consists of two control signals of different phases for driving the two gates, and each vertical CCD is driven by six control signals of different phases. Also, the horizontal CCD is driven by two control signals of different phases.

The boundaries for the respective colors may define the same portion of charge addition, or different portions. Furthermore, if pixels indicated by resulting electric charges obtained by charge addition are not arranged at even intervals in a two-dimensional matrix, a filter to correct the uneven arrangement may be employed.

A portion of charge addition for each color may have L rows and C columns, where L=4m+2, C=4n+2, and m and n are natural numbers. Also, a boundary to define a portion of charge addition for one of the colors may deviate from boundaries for the other colors by L/2 rows, by C/2 columns, and by L/2 rows and C/2 columns. In the above description about the solid-state imaging element 31, m and n are set at one. Which is to say, the portion of charge addition has six rows and six columns. In addition, the boundary Y deviates from the boundary M by three rows, from the boundary C by three columns, and from the boundary G by three rows and three columns.

The Bayer color filter array may be used for the color filter array in the present embodiment. A repetitive part of the color filter array pattern may have four rows and two columns. In this repetitive part, photoelectric conversion elements of the first row and first column and the third row and second column have color filters of the same color. The same applies to photoelectric conversion elements of the first row and the second column and the third row and the first column, photoelectric conversion elements of the second row and the first column and the fourth row and the second column, and photoelectric conversion elements of the second row and the second column and the fourth row and the first column. Alternatively, the repetitive part of the color filter array pattern may have two rows and four columns. In this case, photoelectric conversion elements of the first row and first column and the second row and third column have color filters of the same color. The same applies to photoelectric conversion elements of the second row and the first column and the first row and the third column, photoelectric conversion elements of the first row and the second column and the second row and the fourth column, and photoelectric conversion elements of the second row and the second column and the first row and the fourth column.

The drive unit 32 may individually send first to sixth read signals and first to sixth connection transfer signals, to the solid-state imaging element 31. Here, the solid-state imaging element 31 may have wirings to send read signals different from each other respectively to photoelectric conversion elements in six successive rows, and wirings to send connection transfer signals different from each other respectively to connection CCDs in six successive columns.

The above-mentioned modification examples are described in detail in the related application, and therefore not specifically explained here.

Japanese Patent Application No. 2003-018143 similarly discloses a construction to add together electric charges, to obtain a resulting electric charge for nine pixels, and read the resulting electric charge, using a metal oxide semiconductor (MOS) solid-state imaging element. The solid-state imaging element 31 may be realized using this construction.

(Comparison of Frequency Characteristics)

The following part explains that the imaging device 30 having the above-mentioned construction produces an image with higher image quality, when compared with the conventional resolution reduction technique of discarding some pixels and then performing a zoom operation. The explanation is made based on comparison of spatial frequency characteristics of images.

Figure 4:
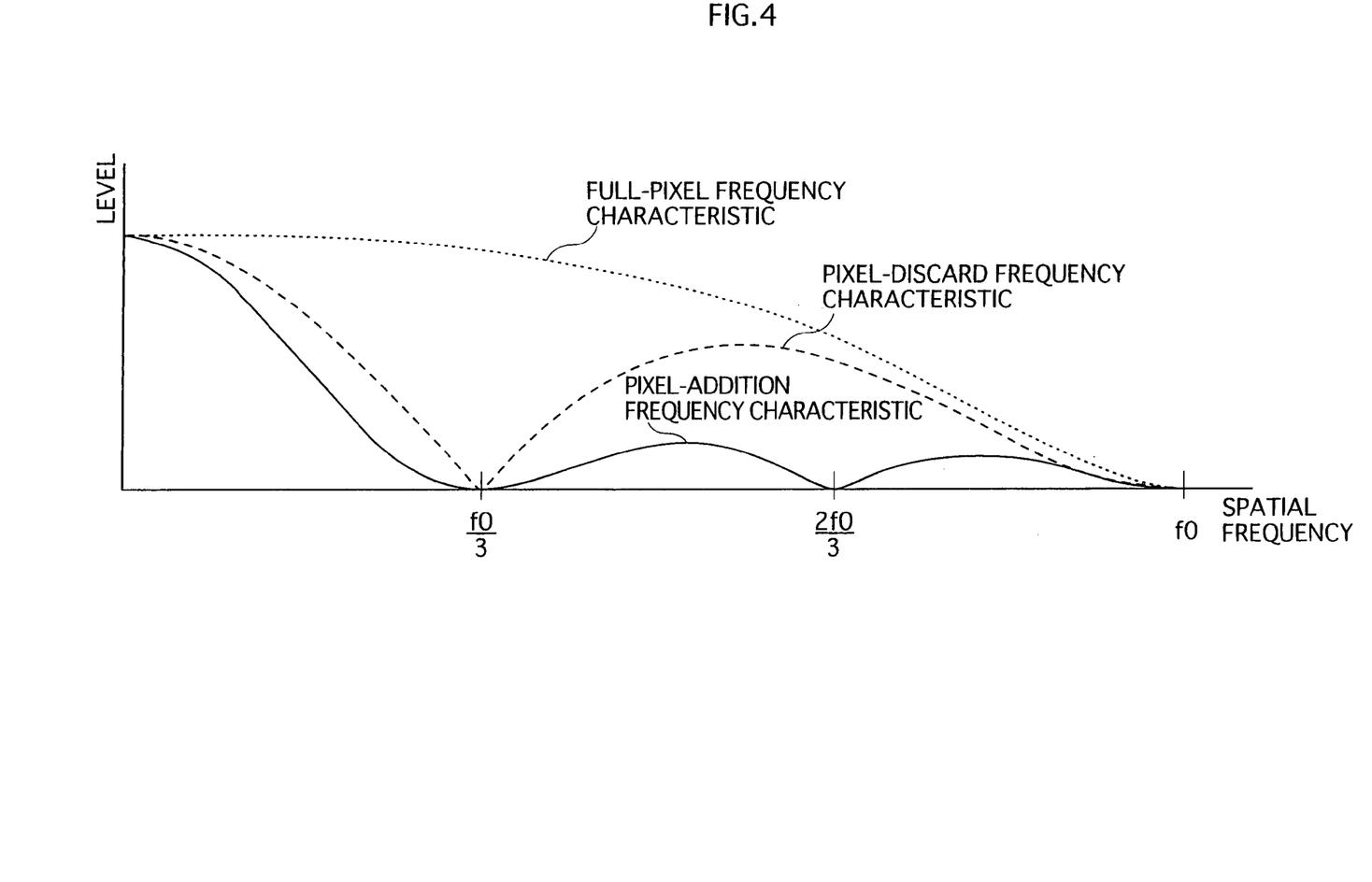
FIG. 4 is a graph illustrating a frequency characteristic of each of a full-pixel image, a pixel-addition image and a pixel-discard image.

FIG. 4 is a graph illustrating spatial frequency characteristics of three types of images. A spatial frequency is plotted along a horizontal axis, and a level of a signal component included in an image is plotted along a vertical axis. Hereinafter, a spatial frequency is simply referred to as a frequency.

A full-pixel frequency characteristic indicates a frequency component in an image with the original resolution of the solid-state imaging element 31. In such an image, one pixel is represented by an electric charge stored in each of the photoelectric conversion elements in the solid-state imaging element 31.

In FIG. 4, f0 indicates a Nyquist frequency corresponding to the original resolution of the solid-state imaging element 31. The solid-state imaging element 31 includes an optical filter to eliminate aliasing noise generated by sampling. The filter eliminates frequency components exceeding f0.

A pixel-addition frequency characteristic indicates a frequency component in a pixel-addition image. In the pixel-addition image, each pixel is represented by a resulting electric charge for nine pixels in terms of the original resolution of the solid-state imaging element 31. A resulting electric charge for nine pixels is obtained by adding electric charges together based on the construction mentioned above.

In comparison with the pixel-addition frequency characteristic, a pixel-discard frequency characteristic indicates a frequency component in a pixel-discard image. In the pixel-discard image, each pixel is represented by an electric charge stored in one of nine photoelectric conversion elements that have color filters of the same color. Such nine photoelectric conversion elements are successively arranged 3×3 in the row direction and the column direction, in the matrix of the photoelectric conversion elements in the solid-state imaging element 31. Electric charges stored in remaining eight photoelectric conversion elements are either discarded, or not read.

The pixel-addition image and the pixel-discard image both have a tentative resolution, which is one ninth of the original resolution of the solid-state imaging element 31. In FIG. 4, f0/3 indicates a Nyquist frequency corresponding to the tentative resolution. According to a sampling theorem, signal components of frequencies exceeding f0/3 appear as aliasing noise in the images with the tentative resolution, and therefore worsen image quality.

As shown in FIG. 4, the pixel-discard image has more signal components exceeding f0/3, which worsen image quality, than the pixel-addition image. The reason for this is explained in the following. To perform charge addition, electric charges in multiple pixels adjacent to each other are added to one another. This process entails an effect of a spatial low pass filter (LPF). However, a process of discarding pixels does not produce the effect of the spatial low pass filter, and therefore can not eliminate signal components exceeding f0/3.

Figure 5:
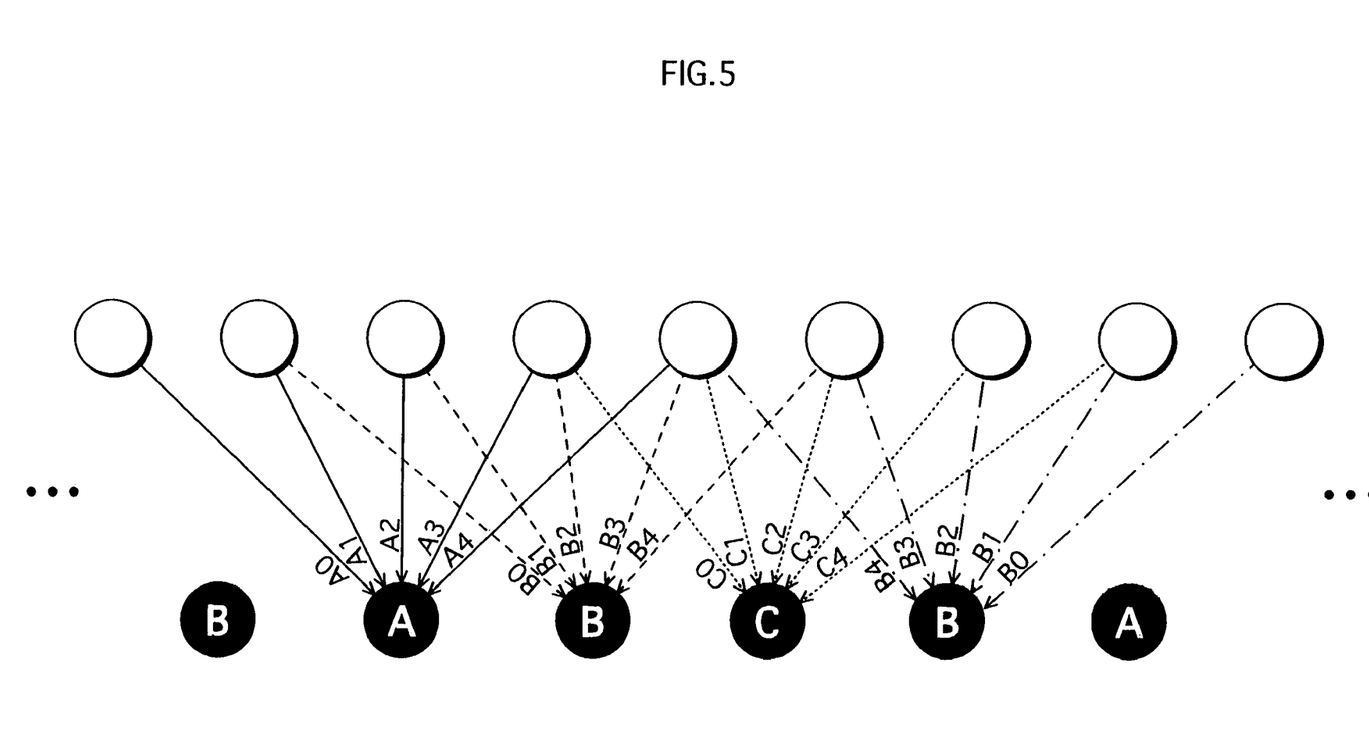
FIG. 5 is a schematic view illustrating a zoom operation.

FIG. 5 is a schematic view illustrating the zoom operation performed by the zoom and contour-correction unit 37. The zoom operation is specifically disclosed in the patent document 1, and therefore only briefly described here with focusing on its features.

FIG. 5 illustrates the zoom operation to generate new pixels, by resampling, that are arranged at an interval which have, for example, a five-quarter length of an interval between adjacent original pixels. In FIG. 5, white circles on the upper side represent the original pixels, and black circles on the lower side represent the new pixels to be generated by the resampling. A location of a new pixel to be generated by the resampling (hereinafter referred to as a pixel location) is (A) the same as a location of an original pixel, (B) away from an original pixel by a quarter of the interval between two adjacent original pixels, or (C) midway between two adjacent original pixels.

The resampling is performed by multiplying five original pixels in the vicinity of each pixel location by coefficients unique to a corresponding one of the cases (A), (B) and (C) (A0 to A4, B0 to B4 or C0 to C4 in FIG. 5), and adding the multiplication results to one another.

The patent document 1 discloses a criteria to select coefficients that achieve comparatively even frequency characteristics regardless of different-pixel locations, and a construction which prestores coefficients in a table in order to multiply original pixels by coefficients corresponding to a particular pixel location and add the multiplication results to one another.

Figure 6:
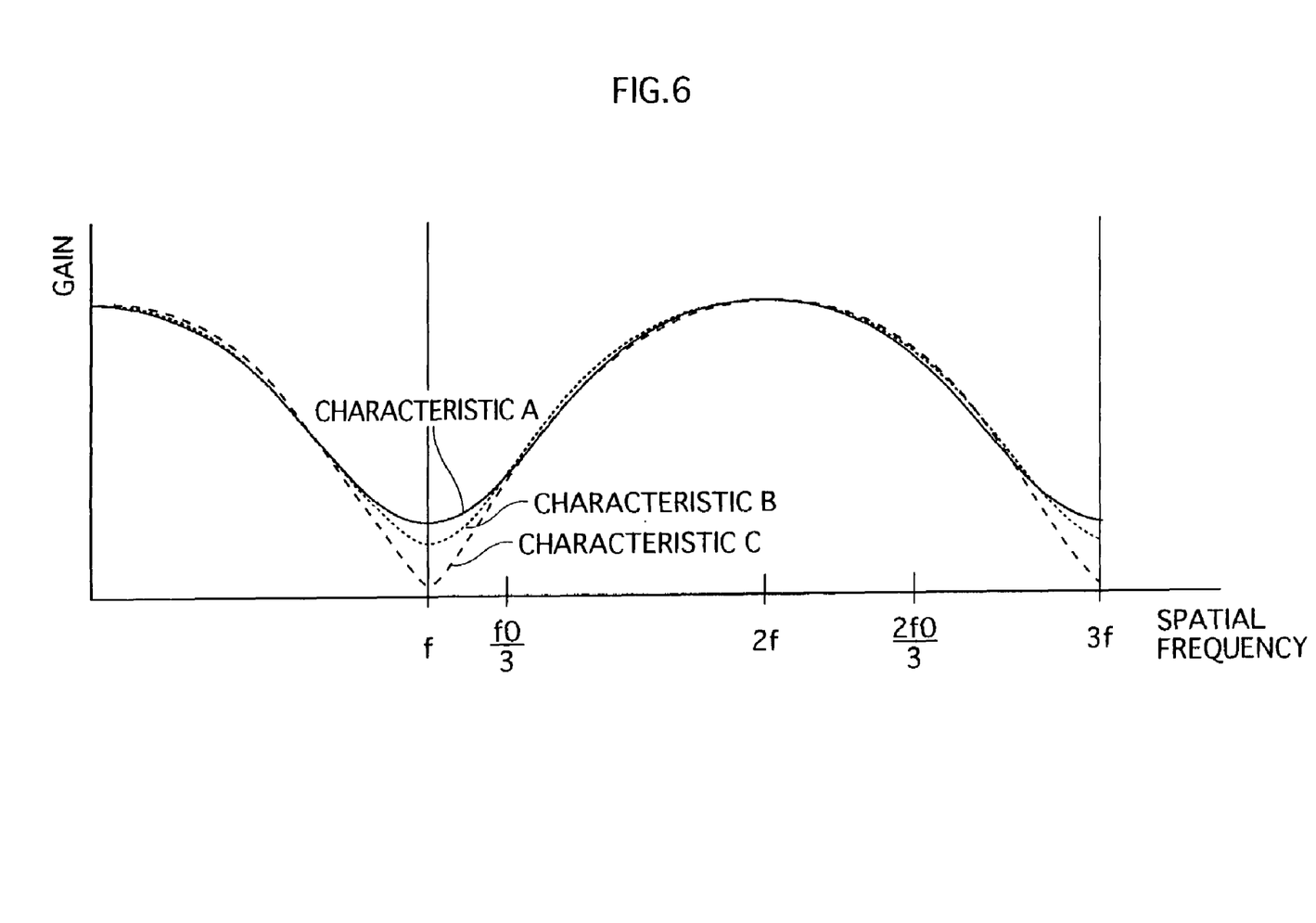
FIG. 6 is a graph illustrating, as an example, frequency characteristics as a result of the zoom operation.

FIG. 6 is a graph illustrating, as an example, frequency characteristics of gains obtained by the zoom operation. In FIG. 6, f indicates a Nyquist frequency corresponding to the target resolution that is achieved by the resampling. The Nyquist frequency f0/3 corresponding to the tentative resolution is illustrated in FIG. 6 for reference. FIG. 6 shows, as an example, characteristics A, B and C, which are respectively frequency characteristics in the above-mentioned cases of (A), (B) and (C). The gain at the frequency f becomes smaller in the order of the characteristics A, B and C, and even the smallest gain for the characteristic C is not zero at the frequency f.

According to this zoom operation, variance in frequency characteristic due to difference in pixel location is reduced, and therefore excellent image quality is achieved.

Figure 7:
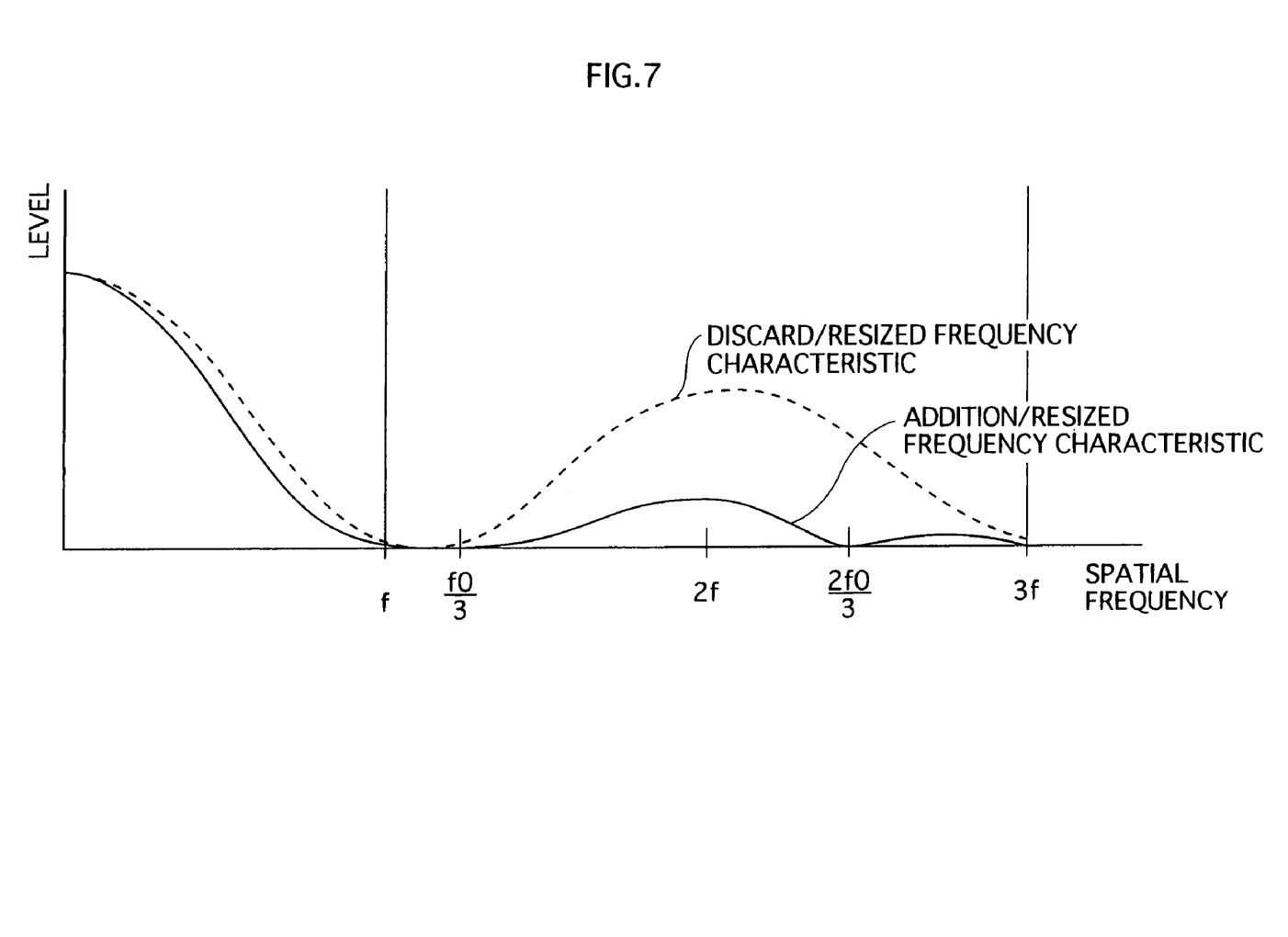
FIG. 7 is a graph illustrating a frequency characteristic of each of an addition/resized image and a discard/resized image.

FIG. 7 is a graph illustrating a frequency characteristic of each of an addition/resized image and a discard/resized image. The addition/resized image and the discard/resized image are respectively obtained by performing the zoom operation on the pixel-addition image and the pixel-discard image.

The frequency characteristics of the addition/resized image and the discard/resized image are respectively obtained by multiplying the pixel-addition frequency characteristic and the pixel-discard frequency characteristic shown in FIG. 4 by the frequency characteristics as a result of the zoom operation shown in FIG. 6. As described above, there are multiple types of frequency characteristics of gains as a result of the zoom operation, corresponding to the different pixel locations. In this multiplication, a minimum value at each frequency is used for the sake of better understanding.

Figure 8:
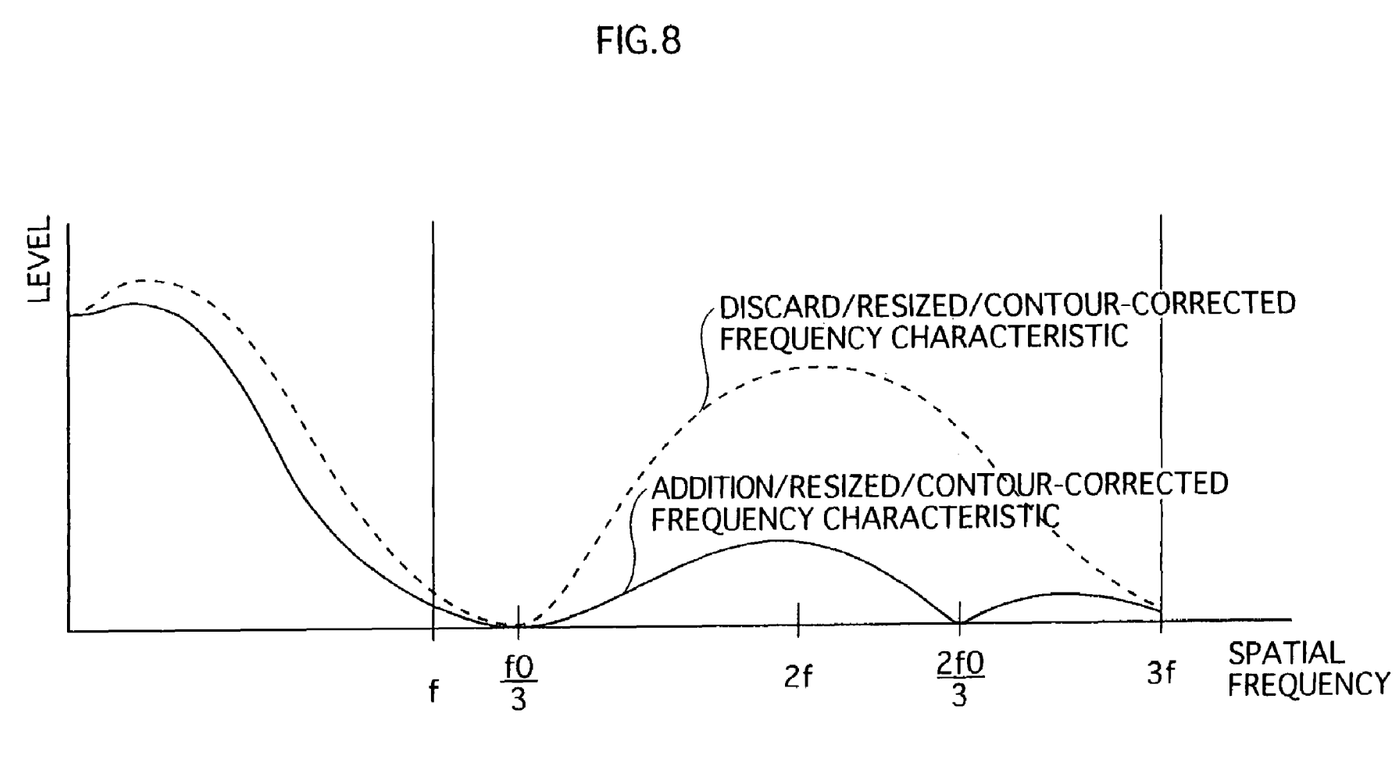
FIG. 8 is a graph illustrating a frequency characteristic of each of an addition/resized/contour-corrected image and a discard/resized/contour-corrected image.

FIG. 8 is a graph illustrating a frequency characteristic of each of an addition/resized/contour-corrected image and a discard/resized/contour-corrected image, which are respectively obtained by performing a contour-correction operation on the addition/resized image and the discard/resized image.

As seen from the above description, when a group of the pixel-addition image, the addition/resized image, and the addition/resized/contour-corrected image is compared with a group of the pixel-discard image, the discard/resized image and the discard/resized/contour-corrected image, the images in the former group have a lower level of signal components that exceed the Nyquist frequency corresponding to the target resolution and worsen image quality. This shows that the imaging device 30 relating to the embodiment of the present invention produces an image with higher image quality, when compared with the conventional resolution reduction technique of discarding some pixels.

A signal component at the Nyquist frequency f corresponding to the target resolution is never zero in the addition/resized/contour-corrected image obtained by the imaging device 30.

This distinctive feature is achieved by employing a solid-state imaging element that produces an image with a tentative resolution higher than a target resolution by pixel addition. Specifically speaking, the solid-state imaging element first generates a pixel-addition image with the tentative resolution higher than the target resolution. The solid-state imaging element then performs a zoom operation, whereby even the smallest gain at the frequency f corresponding to the target resolution is never zero, and a contour-correction operation on the pixel-addition image, to obtain an addition/resized/contour-corrected image with the target resolution.

Assume a solid-state imaging element that produces an image with a resolution equal to a target resolution by pixel addition. In such a solid-state imaging element, a zoom operation can not be performed to produce an image with the target resolution. In this case, it is impossible to keep a signal component at the frequency f corresponding to the target resolution in the image with the target resolution.

The pixel-addition image obtained by this solid-state imaging element and the addition/resized/contour-corrected image obtained by the imaging device 30 relating to the embodiment of the present invention have the same resolution. However, the addition/resized/contour-corrected image has a higher level of high-frequency components in the vicinity of the frequency f.

This represents that the imaging device 30 relating to the embodiment of the present invention can produce an image which has a target resolution, keeps a signal component at the frequency f corresponding to the target resolution and therefore has an excellent high-frequency characteristic. These effects can be obtained because the imaging device 30 uses a solid-state imaging element that produces an image with a resolution higher than a target resolution by pixel addition.

What is claimed is:

1. An imaging device that produces image data showing an image with a target resolution lower than an original resolution of the imaging device, comprising:
    a plurality of photoelectric conversion elements which are arranged in a two-dimensional matrix, each have a color filter of a predetermined color selected from a plurality of colors on a light-receiving surface thereof, each store an electric charge by photoelectric conversion, and in each row and column of the matrix, two of the plurality of colors are arranged alternately;
    a charge adding unit operable to, for each portion of L rows and C columns in the matrix, where $6 \leq L$, $6 \leq C$ and L and C are even natural numbers, add together electric charges stored in photoelectric conversion elements that have color filters of a same color in the portion, to obtain a resulting electric charge, the charge adding unit adding together the electric charges by repeatedly adding together electric charges in a row direction and transferring a result by two rows and furthermore repeatedly adding together electric charges in a column direction and transferring a result by two columns;
    a read unit operable to read resulting electric charges for all portions of L rows and C columns in the matrix;
    an image data generating unit operable to generate image data showing an image based on the read resulting electric charges, the image having a tentative resolution which is lower than the original resolution; and
    a zoom unit operable to zoom the image with the tentative resolution so as to reduce the tentative resolution to the target resolution and produce the image data showing the image with the target resolution, wherein
    a number of the plurality of photoelectric conversion elements is greater than a number of photoelectric conversion elements required for the tentative resolution to be equal to the target resolution.

2. The imaging device of claim 1, further comprising:
a contour-correction unit operable to correct the image data showing the image with the target resolution to enhance a contour part of the image.

3. The imaging device of claim 1, wherein
in each portion, the charge adding unit adds together electric charges stored in photoelectric conversion elements having color filters of one of the plurality of colors, and
a portion for one of the plurality of colors deviates from a portion for each of a rest of the colors.

4. The imaging device of claim 3, wherein
$L=4m+2$ and $C=4n+2$, where m and n are natural numbers, and
the portion for one of the colors deviates from the portion for each of the rest of the colors by L/2 rows, by C/2 columns, or L/2 rows and C/2 columns.

* * * * *